US012605649B2

(12) United States Patent
Cheung et al.

(10) Patent No.: US 12,605,649 B2
(45) Date of Patent: Apr. 21, 2026

(54) ABSORBENT PAD FOR LEAK MITIGATION

(71) Applicant: Microsoft Technology Licensing, LLC, Redmond, WA (US)

(72) Inventors: Rick Chun Kit Cheung, Lynnwood, WA (US); Luke Thomas Gregory, Mercer Island, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 981 days.

(21) Appl. No.: 17/745,500

(22) Filed: May 16, 2022

(65) Prior Publication Data

US 2023/0364527 A1 Nov. 16, 2023

(51) Int. Cl.
 *B01D 12/00* (2006.01)
 *D02G 3/04* (2006.01)
 *D03D 15/283* (2021.01)

(52) U.S. Cl.
 CPC .............. *B01D 12/00* (2013.01); *D02G 3/04* (2013.01); *D03D 15/283* (2021.01); *C08J 2300/14* (2013.01)

(58) Field of Classification Search
 CPC ........ B01D 12/00; D03D 15/283; D02G 3/04; C08J 2300/14
 See application file for complete search history.

(56) References Cited

U.S. PATENT DOCUMENTS

| | | | | |
|---|---|---|---|---|
| 5,507,178 | A | * | 4/1996 | Dam ........................ G01M 3/24 |
| | | | | 73/61.49 |
| 2004/0160741 | A1 | * | 8/2004 | Moss ................. H05K 7/20009 |
| | | | | 361/679.48 |
| 2004/0188069 | A1 | * | 9/2004 | Tomioka ................. G06F 1/206 |
| | | | | 257/E23.098 |
| 2007/0044940 | A1 | * | 3/2007 | Shiozawa ............. G06F 1/1632 |
| | | | | 165/104.31 |
| 2014/0020763 | A1 | * | 1/2014 | Phlegm ................... B60L 58/20 |
| | | | | 137/467.5 |
| 2022/0034743 | A1 | | 2/2022 | Acharya |

FOREIGN PATENT DOCUMENTS

EP        3933137 A1     1/2022

OTHER PUBLICATIONS

Gerhard, Mat For Creating A Leak Location Sensor . . . , Jan. 5, 2022, EP3933137A1, Whole Document (Year: 2022).*
"International Search Report and Written Opinion Issued in PCT Application No. PCT/US2023/013389", Mailed Date: Jun. 5, 2023, 12 Pages.

* cited by examiner

*Primary Examiner* — Larry L Furdge
(74) *Attorney, Agent, or Firm* — Ray Quinney & Nebeker P.C.; Paul N. Taylor

(57) ABSTRACT

A leak mitigation system for a fluid-cooled computing device includes an absorbent pad having a fluid sensor connected to an absorbent material. The absorbent pad is placed in a position relative to the fluid-cooled computing device to collect fluid from the cooling system. The sensor detects the presence of a fluid absorbed by the absorbent material and the leak mitigation system implements a leak mitigation protocol.

20 Claims, 13 Drawing Sheets

Monitor fluid in a computing system with a fluid sensor in an absorbent pad — 764

Is the fluid above threshold?

No

766

Yes

Implement leak mitigation — 768

ABSORBENT PAD FOR LEAK MITIGATION

CROSS-REFERENCE TO RELATED APPLICATIONS

N/A.

BACKGROUND

Computing devices, including processors, are simultaneously increasing in processing power while reducing in size. This may result in the heat-generating elements of computing devices having a higher density of heat generation. Modern computing systems include cooling systems which transfer heat away from the heat-generating element during operation.

One type of cooling system is a fluid cooling system. Fluid-cooled computing systems utilize a cold fluid conveyed to a cold plate connected to the other heat generating element. The cold fluid absorbs the generated heat. The cooling fluid is circulated through a network of pipes, hoses, and valves to transfer cold fluid to the cold plate and transfer warm fluid away from the cold plate. In some situations, fluid from a fluid cooling system may leak, which may damage the processors and other components of the fluid-cooled computing system.

BRIEF SUMMARY

In some embodiments, an absorbent pad for a fluid-cooled computing device includes an absorbent material configured to absorb a fluid from the fluid-cooled computing device. A fluid sensor is connected to the absorbent material to detect a presence of the fluid absorbed by the absorbent material. This may help to identify leaks early, thereby improving response time. This may further help to absorb leaked fluid, thereby reducing or preventing damage to computing components.

In other embodiments, a computing system includes at least one heat generating element and a cooling system having a fluid. An absorbent pad is configured to absorb a fluid from the cooling system. The absorbent pad includes an absorbent material and a fluid sensor connected to the absorbent material.

In yet other embodiments, a method for detecting a leak in a fluid-cooled computing device includes placing an absorbent pad in a position to receive a fluid from a cooling system. A presence of the fluid is detected by a fluid sensor connected to the absorbent pad. The absorbent pad absorbs the fluid.

This summary is provided to introduce a selection of concepts that are further described below in the detailed description. This summary is not intended to identify key or essential features of the claimed subject matter, nor is it intended to be used as an aid in limiting the scope of the claimed subject matter.

Additional features and advantages of embodiments of the disclosure will be set forth in the description which follows, and in part will be obvious from the description, or may be learned by the practice of such embodiments. The features and advantages of such embodiments may be realized and obtained by means of the instruments and combinations particularly pointed out in the appended claims. These and other features will become more fully apparent from the following description and appended claims, or may be learned by the practice of such embodiments as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which:

FIG. 2-1 through FIG. 2-6 are representations of absorbent pads having different patterns of wires for a fluid sensor, according to at least one embodiment of the present disclosure;

FIG. 3-1 through FIG. 3-4 are representations of absorbent pads having different locations of a fluid sensor in an absorbent material, according to at least one embodiment of the present disclosure;

FIG. 4 is a cross-sectional view of a leak mitigation system, according to at least one embodiment of the present disclosure;

FIG. 5 is a representation of a leak mitigation system, according to at least one embodiment of the present disclosure;

FIG. 6 is a representation of a method for detecting a leak, according to at least one embodiment of the present disclosure.

DETAILED DESCRIPTION

This disclosure generally relates to devices, systems, and methods for leak detection and mitigation in fluid-cooled computing systems. An absorbent pad includes an absorbent material and a sensor. In some situations, a cooling system may leak, such as through wear and tear, catastrophic failure, or condensation from cold cooling pipes contacting moisture-laden air. Cooling system leaks may contact processors or other electronic components of the computing system, which may damage or destroy them. A leak in the cooling system may be at least partially absorbed by the absorbent pad. The sensor may sense the presence of the fluid on the absorbent pad. After sensing the presence of the fluid on the absorbent pad, a leak mitigation system may implement one or more mitigation protocols, such as closing a cooling system valve. Absorbing and/or mitigating leaks may help to reduce damage to a computing server, rack, or data center.

In accordance with at least one embodiment of the present disclosure, the sensor may include a fluid sensor. The fluid sensor may be configured to measure at least one of a location of the leak, a quantity of the leak, a rate of the leak, a fluid type of the leak, any other quality of the leak, and combinations thereof. Identifying leak qualities may allow a leak mitigation system to determine which actions may help to mitigate the leak. Such actions may include shutting off cooling pumps (e.g., removing power to the pumps, reducing flow from the cooling pumps, sending a signal to the pumps to be shut off), closing valves to the leaking fluid pipes, generating a warning for a technician, any other action, and combinations thereof. In some embodiments, the cooling system may generate condensation from moisture in the atmosphere of the data center. The leak mitigation systems of the present disclosure may distinguish between condensation and cooling fluid, and prepare different mitigation protocols accordingly.

In some embodiments, a leak mitigation system may monitor leaks in a data center or other fluid-cooled computing system. In some embodiments, the leak mitigation system may continuously monitor leaks in the data center. For example, the leak mitigation system may request measurements from the fluid sensor periodically, such as on a time-based schedule. In some embodiments, the leak mitigation system may monitor leaks and include controls to implement the mitigation protocols. For example, while monitoring leaks, the leak mitigation system may determine that a leak is occurring at a particular server. Upon detection of the leak, the leak mitigation system may instruct the cooling system to stop providing cooling fluid to the particular server, such as by closing a valve or shutting off a pump. As discussed herein, this may help to reduce or prevent damage to servers in the data center, including servers located adjacent or within a fluid flow path (such as by dripping or spraying) of the leak location.

Figure 1:
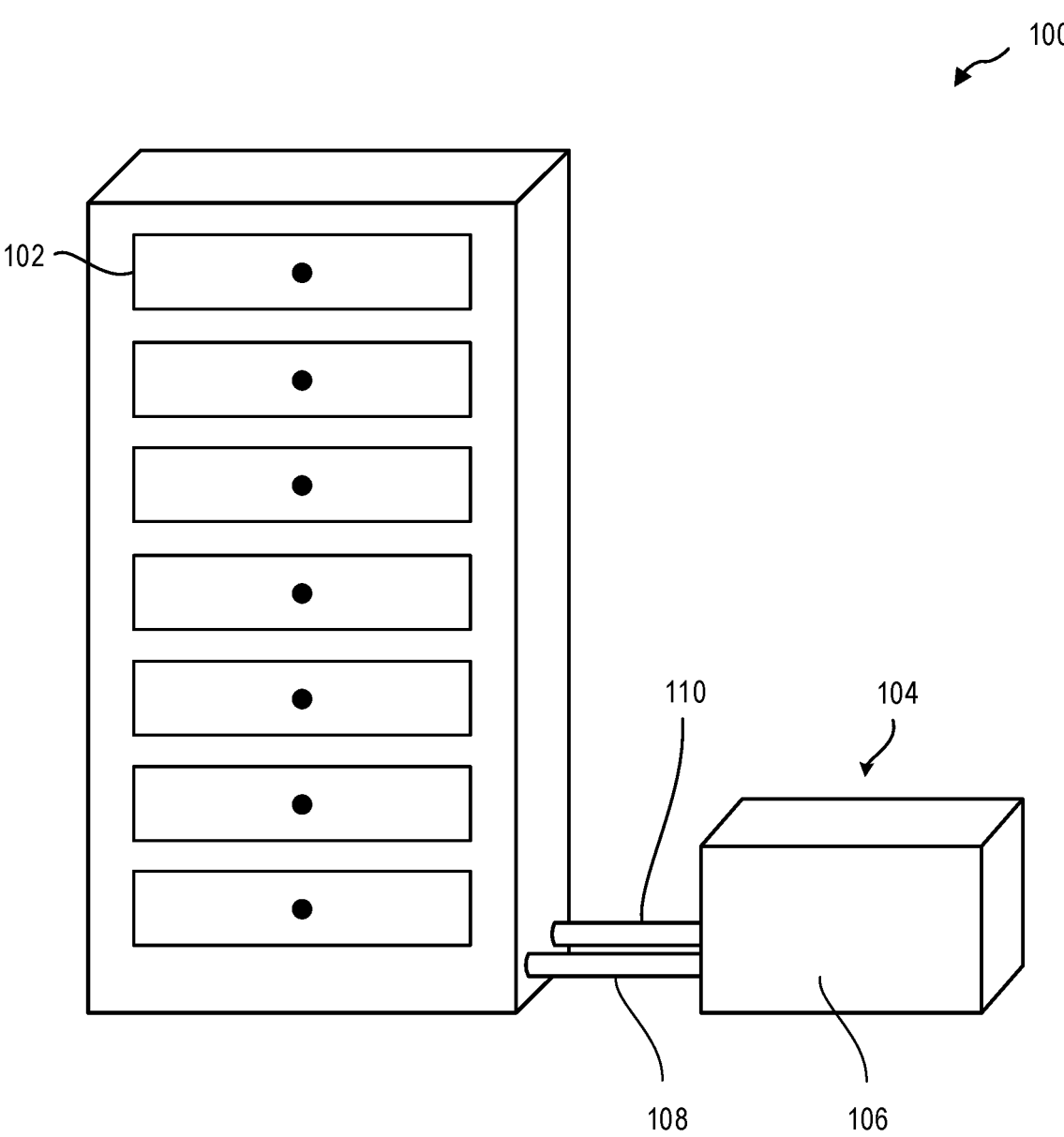
FIG. 1-1 and FIG. 1-2 are representations of a server rack, according to at least one embodiment of the present disclosure.

FIG. 1-1 is a representation of a rack 100 having a plurality of servers installed in a plurality of shelves 102 in the rack 100, according to at least one embodiment of the present disclosure. The servers may include one or more computing devices secured to an individual shelf 102. Multiple servers may be installed in the rack 100 which may be configured to perform processing, memory storage, or other functions. The rack 100 may be a part of a data center, which may include multiple racks 100. The servers in the rack 100 may be part of a cloud computing system. A cloud computing system may refer to a network of connected computing devices that provide various services to client devices.

Computing devices, such as processors, memory, and so forth, may generate heat during operation. But a computing device that operates a too high of temperature may perform less efficiently. In some situations, a computing device that operates at too high a temperature may become damaged and have a reduced overall capacity.

To lower the temperature of the servers installed on the shelves 102, a rack 100 may include a cooling system 104. The cooling system 104 may draw heat away from the servers in the rack 100. The cooling system 104 may operate by passing a fluid on or over the servers. Various types of cooling systems 104 may be used, depending on the properties of the particular data center, rack 100, shelves 102, and servers. Examples of cooling systems 104 include air cooling (e.g., blowing air across the computing devices), fluid cooling (e.g., running a fluid through a cold plate connected to the computing device), immersion cooling (e.g., immersing the computing device in a dielectric fluid), any other type of cooling, and combinations thereof.

In the embodiment shown in FIG. 1-1, the cooling system 104 may be a fluid cooling system. A pump 106 may pump cooling fluid through an inlet 108 into the rack 100. The cooling fluid may be directed from the inlet 108 to the various servers stored on the shelves 102. The cooling fluid may reduce the operating temperature of the servers to below a threshold temperature. The cooling fluid may be returned to the pump 106 through an outlet 110. In some embodiments, the pump 106 may include fluid cooling fins, a fluid storage tank, fluid chillers, and other elements. The cooling system 104, including the pump 106, inlet 108, cold plates, and outlet 110 may include multiple hydraulic elements, including valves, diversions, tanks, and so forth. The elements of the cooling system 104 may be controlled by a leak mitigation system. For example, upon detection of a leak, the leak mitigation system may provide instructions to the cooling system to modify the operation of one of the hydraulic elements. For example, the leak mitigation system my adjust the flow of cooling fluid through a valve or diversion, thereby reducing fluid flow through the leaking portion of the cooling system 104, as discussed in further detail herein.

During operation, the cooling system 104 may experience a leak. For example, one or more seals, valves, pipes, hoses, or other elements of the cooling system 104 may break down or otherwise degrade. A leak in the cooling system 104 may cause damage to the rack 100. For example, a leak in the cooling system 104 may cause some of the cooling fluid to contact the servers. Cooling fluid contacting the servers may damage one or more of the electronic components in the servers. In some situations, cooling fluid contacting the servers may completely ruin the server. This may increase the cost of operating the rack 100. In some situations, cooling fluid from a leak on a server in the rack 100 may drip or flow down to servers lower on the rack 100. This may damage multiple servers on the rack 100, further increasing the cost of a leak. In some situations, cooling fluid from the leak may spill onto the floor. To clean the leaked cooling fluid, the entire data center may be shut down, thereby interrupting service to the customers of the data center, resulting in reduced computing efficiency, reduced computing capacity, lower customer satisfaction, and lost revenue.

In accordance with at least one embodiment of the present disclosure, the rack 100 may include one or more absorbent pads. The absorbent pads may be located in any position of the rack 100. For example, and as discussed in further detail herein, the absorbent pads may be located in a position to collect fluid from the cooling system 104. In some embodiments, the absorbent pads may be located under individual servers to receive a fluid from the cooling system 104. In some embodiments, the absorbent pads may be located at the base of an individual shelf 102. In some embodiments, the absorbent pads may be located underneath the inlet 108 and/or the outlet 110. In some embodiments, the absorbent pads may be wrapped around various hoses and pipes of the cooling system 104.

In some embodiments, the absorbent pads in the rack 100 may include one or more fluid sensors. The fluid sensors may detect the presence of fluid from the cooling system 104. For example, the fluid sensors may detect a change in resistance of a current passed through a wire. A current may be passed through wires in the fluid sensors. The resistance of the wires may be determined based on the voltage drop between the wires. Fluid in contact with the wires may cause a change in resistance across the wires, thereby allowing the fluid sensor to detect the presence of a fluid. The change in resistance may be caused by fluid absorbed by the pad. In some embodiments, the fluid sensors may determine one or more of a location of the absorbed fluid, an amount of the absorbed fluid, a rate of increase in the amount of absorbed fluid, any other leak quality, and combinations thereof.

In accordance with at least one embodiment of the present disclosure, the absorbent pads may be connected to a leak mitigation system. Upon detection of a leak, the leak mitigation system may implement one or more mitigation protocols. For example, the leak mitigation system may turn off the pump 106, close one or more valves, apply a sealing agent, activate an alarm or other notification, perform any other mitigation protocol, and combinations thereof.

In some embodiments, the leak mitigation system may differentiate between condensation caused by cold fluid flowing through inlet pipes. For example, condensed water may have different conductive properties than the cooling fluid. The fluid sensor in the absorbent pad may identify whether the absorbed fluid is water or the cooling fluid. Based on the type of fluid, the leak mitigation system may implement a different mitigation protocol. For example, if the leak is identified as water condensed on inlet pipes, the leak mitigation system may allow the fluid to dry from the absorbent pad. If the leak is identified as the cooling fluid, the leak mitigation system may cut off the supply of cooling fluid to the rack 100.

Figures 1, 2:
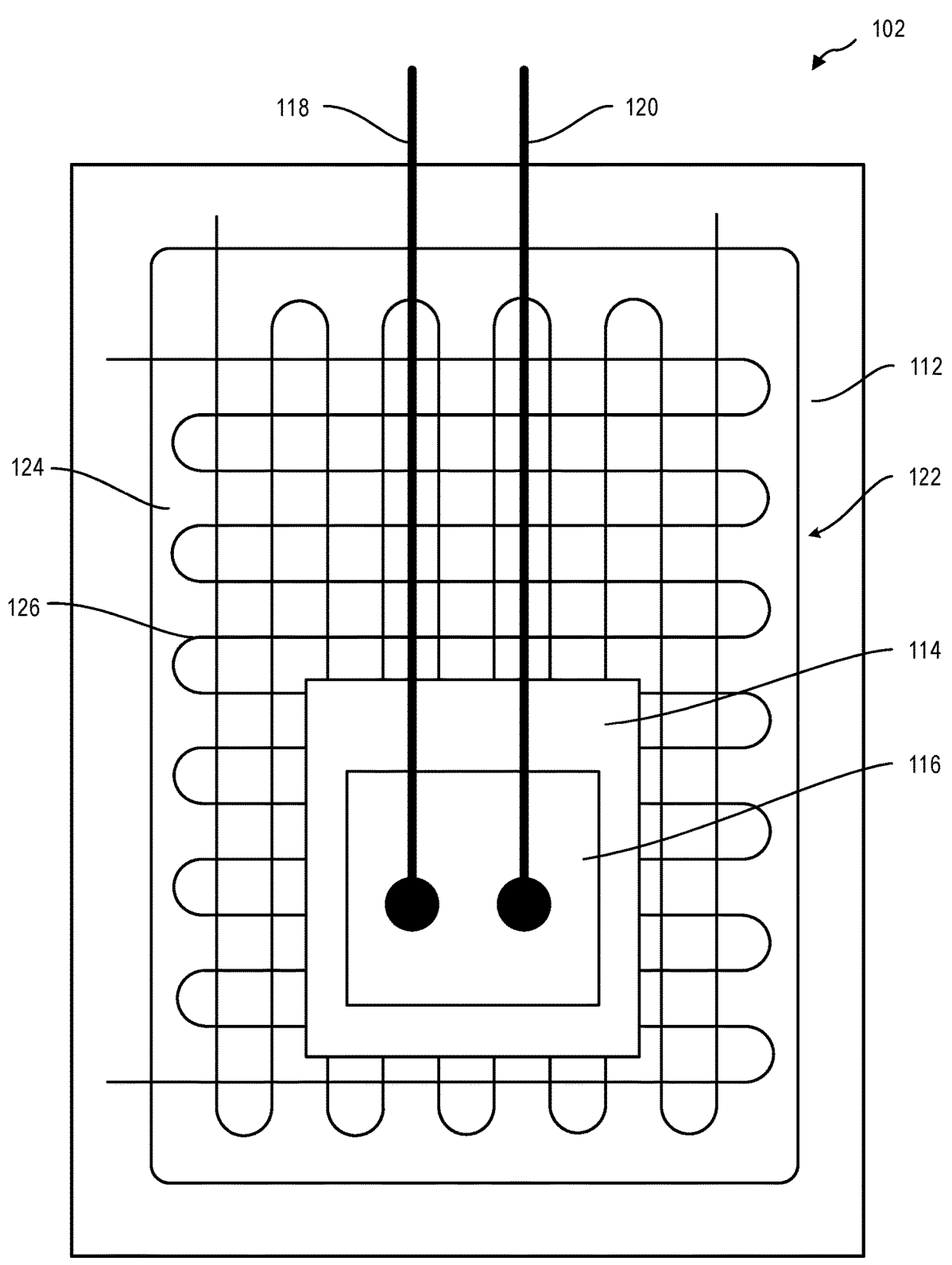

FIG. 1-2 is a representation of a shelf 102 of the rack 100 of FIG. 1-1. The shelf 102 includes a tray 112. A fluid-cooled computing device 114 is secured to the tray 112. The fluid-cooled computing device 114 includes one or more heat generating elements, such as a processor (e.g., a CPU, GPU, or VPU), a server or one or more components thereof, any other heat generating elements, and combinations thereof. A cold plate 116 is connected to the fluid-cooled computing device 114 at the heat generating elements. A server fluid inlet 118 provides cold cooling fluid to the cold plate 116 and a server fluid outlet 120 returns the warmed cooling fluid away from the cold plate 116.

An absorbent pad 122 is located on the tray 112. The absorbent pad 122 may be located in any location where fluid from the cooling system 104 may drip. For example, the absorbent pad 122 may be located below the server fluid inlet 118, the server fluid outlet 120, the cold plate 116, any other portion of the shelves 102, and combinations thereof.

The absorbent pad 122 includes an absorbent material 124 and a fluid sensor 126. The fluid sensor 126 may be connected to the absorbent material 124. In some embodiments, the fluid sensor 126 may be embedded within the absorbent material 124. In some embodiments, the fluid sensor 126 may be connected to an outer surface of the absorbent material 124. In accordance with at least one embodiment of the present disclosure, the absorbent material 124 may be any type of absorbent material. For example, the absorbent material may include natural fibers, such as cotton, wool, bamboo, any other natural fibers, and combinations thereof. In some examples, the absorbent material may include synthetic fibers, such as nylon, polypropylene, and the like. In some examples, the absorbent material may include a combination of natural and synthetic fibers. In some examples, the absorbent material may include a woven material or a woven fabric. For example, the absorbent material may include a fabric or material woven in a pattern to allow the material to absorb fluids. In some examples, the absorbent material may include pellets, such as those found in fluid absorbing diapers. In some embodiments, the absorbent material may include pellets located within an absorbent woven fabric.

The fluid sensor 126 may extend across an area of the absorbent material 124. In some embodiments, because the fluid sensor 126 extends across the absorbent material 124, the fluid sensor 126 may identify a location of fluid that is absorbed by the absorbent material 124. Identifying the location of a fluid absorbed by the absorbent material 124 may allow a technician or operator to determine a source of the fluid. For example, if the fluid is absorbed below the fluid-cooled computing device 114, then the fluid may be a result of a leak at the cold plate 116. In some embodiments, if the fluid is absorbed below the server fluid inlet 118, then the fluid may be a result of condensation forming on the server fluid inlet 118 from cold fluid passing through the server fluid inlet 118.

In some embodiments, the fluid sensor 126 may determine a volume of fluid absorbed by the absorbent material 124. For example, an area of the absorbed fluid in the absorbent material 124 may result in more of the fluid sensor 126 detecting the absorbed fluid. In some examples, the amount of the effect of the fluid on the resistance of the fluid sensor 126 may indicate a concentration of absorbed fluid in the absorbent material 124.

The fluid sensor 126 may periodically take measurements of the fluid absorbed by the absorbent material 124. For example, the fluid sensor 126 may take measurements on a schedule, such as 100 measurements per second, 50 measurements per second, 25 measurements per second 10 measurements per second 5 measurements per second, 1 measurement per second, a measurement every 2 seconds, a measurement every 5 seconds, a measurement every 10 seconds, a measurement every 20 seconds, a measurement every 30 seconds, a measurement every 1 minute, a measurement every 5 minutes, a measurement every 10 minutes, a measurement every 30 minutes, or any time therebetween.

The fluid sensor 126 may determine the location and/or volume of the material absorbed by the absorbent material 124 with every measurement. The fluid mitigation system may determine changes in the location and/or volume of the material. In some embodiments, the fluid mitigation system may determine a rate of change of the absorption of the fluid. In some embodiments, the fluid mitigation system my implement mitigation protocols based on the rates of change of the fluid. For example, if the rate of change of fluid absorption is increasing, the fluid mitigation system may determine that a leak is present. If the rate of change of fluid absorption is decreasing, the fluid mitigation system may determine that the leak may be resolved.

The absorbent material 124 has a fluid capacity that may be the amount of fluid that the absorbent material 124 may absorb. In some embodiments, the fluid capacity of the absorbent material 124 may be based on the potential size of a leak. For example, the fluid capacity may be sized based on the amount of fluid located in the cold plate 116. In some examples, the fluid capacity may be sized based on the amount of fluid in the server fluid inlet 118 and/or the server fluid outlet 120. In some embodiments, the fluid capacity may be sized based on the total amount of fluid in the cooling system 104. For example, the fluid capacity may be sized to absorb the total amount of fluid in the cooling system 104. In another example, the fluid capacity may be sized to absorb a portion of the total amount of fluid in the cooling system 104. In a further example, the fluid capacity may be sized to absorb at least half of the total amount of fluid in the cooling system 104. In a still further example, the fluid capacity may be sized to absorb more than the total amount of fluid in the cooling system 104. In this manner, fluid released during a catastrophic failure of the cooling system 104 may be entirely absorbed by the absorbent material 124.

In some embodiments, the fluid capacity may be based on the amount of fluid that may be released from the cooling system 104 until the leak is mitigated. For example, the fluid mitigation system may have a reaction time to a detected leak. The reaction time may be the time that it takes to stop flow of the cooling fluid to the fluid-cooled computing device 114. In some embodiments, the fluid capacity of the absorbent material 124 may be the amount of fluid that may be absorbed during the reaction time. In some embodiments, the fluid capacity of the absorbent material 124 may include the volume of fluid remaining in the hoses and pipes of the cooling system 104. In this manner, the absorbent material 124 may absorb all the fluid that may be released in the event of a failure of the cooling system 104.

FIG. 2-1 through FIG. 2-6 are representations of absorbent pads (collectively 222) having various patterns of fluid sensors (collectively 226), according to at least one embodiment of the present disclosure. In some embodiments, the fluid sensors 226 may be located across an area of the absorbent material (collectively 224) of the absorbent pads 222. A sensor coverage of the fluid sensors 226 may be a percentage of the area of absorbent pads 222 across which the fluid sensors 226 may detect the presence of an absorbed fluid. In some embodiments, the sensor coverage may be in a range having an upper value, a lower value, or upper and lower values including any of 50%, 60%, 70%, 80%, 90%, 95%, 97.5%, 99%, 99.9%, or any value therebetween. For example, the sensor coverage may be greater than 50%. In another example, the sensor coverage may be less than 100%. In yet other examples, the sensor coverage may be any value in a range between 50% and 99.9%. In some embodiments, it may be critical that the sensor coverage is greater than 90% to effectively detect the presence of an absorbed fluid from the cooling system. In some embodiments, the sensor coverage may be 100%, or the fluid sensors 226 may detect absorbed fluid across an entirety of the absorbent pads 222.

The fluid sensors 226 may include any type of fluid sensor. In some embodiments, the fluid sensors 226 may include one or more wires. The leak mitigation system may pass an electric current through the one or more wires. The wires have a known resistance. When the absorbent material 224 absorbs a fluid from the cooling system, the fluid may be absorbed at or near the wires. This may change the resistance of the wires. In this manner, by analyzing the resistance of the wires, the leak mitigation system may determine whether a fluid has been absorbed by the absorbent material 224 at or near the fluid sensors 226. In some embodiments, the amount of the absorbed fluid may be reflected by the change in the resistance of the wires. In this manner, the fluid sensors 226 may be able to determine an amount of fluid that has been absorbed by the absorbent material 224.

In accordance with at least one embodiment of the present disclosure, the wires from the fluid sensor may be arranged on the absorbent material 224 in a pattern. For example, in the embodiment shown in FIG. 2-1, a first absorbent pad 222-1 may include a first fluid sensor 226-1 connected to a first absorbent material 224-1. The first fluid sensor 226-1 may be connected to the first absorbent material 224-1 in a sinusoidal pattern. The first fluid sensor 226-1 may be oriented such that a long edge of the first fluid sensor 226-1 may extend between a top side 228 and a bottom side 230 of the first absorbent material 224-1. The first fluid sensor 226-1 may pass from the top side 228 to the bottom side 230, loop around at the bottom side 230, and pass back to the top side 228. This pattern may be repeated from the left side 232 to the right side 234.

In the embodiment shown, the first absorbent material 224-1 has a rectangular shape. But it should be understood that the first absorbent material 224-1 may have any shape, including square, circular, triangular, polygonal, irregular, any other shape, and combinations thereof. In some embodiments, the shape of the first absorbent material 224-1 may be based on the shape of the tray or shelf on which it is to be installed.

In some embodiments, the pattern of the first fluid sensor 226-1 may be based on the shape of the first absorbent material 224-1. For example, if the first absorbent material 224-1 has a circular or triangular shape, the length of the wires on the first fluid sensor 226-1 may change across the width of the first absorbent material 224-1.

In some embodiments, the length of the wires between the top side 228 and the bottom side 230 may be based on a length of the first absorbent material 224-1 between the top side 228 and the bottom side 230. In some embodiments, the wires may extend across greater than 50%, greater than 60%, greater than 70%, greater 80%, greater than 90%, greater than 95%, greater than 99%, or across an entirety of the length of the first absorbent material 224-1 between the top side 228 and the bottom side 230. In some embodiments, the first fluid sensor 226-1 may extend across greater than 90% of the first absorbent material 224-1 to allow the first fluid sensor 226-1 to sense fluid absorbed by the first absorbent material 224-1 at the edge of the top side 228 and/or at the edge of the bottom side 230.

In some embodiments, the repeating lengths of the first fluid sensor 226-1 may extend between the left side 232 and the right side 234. In some embodiments, the repeating lengths of the first fluid sensor 226-1 may extend across greater than 50%, greater than 60%, greater than 70%, greater 80%, greater than 90%, greater than 95%, greater than 99%, or across an entirety of the width of the first absorbent material 224-1 between the left side 232 and the right side 234. In some embodiments, the first fluid sensor 226-1 may extend across greater than 90% of the first absorbent material 224-1 to allow the first fluid sensor 226-1 to sense fluid absorbed by the first absorbent material 224-1 at the edge of the left side 232 and/or at the edge of the right side 234.

The wires of the first fluid sensor 226-1 may have a spacing between lines of wires. The spacing may be based on any factor. In some embodiments, the spacing between the lines of the wires may be based on a desired sensitivity. For example, the spacing between the wires may be reduced below critical areas where a leak may cause damage to the server or computing device. The spacing between the wires may be increased in areas where a leak may be less critical. In some embodiments, the spacing may be even between the left side 232 and the right side 234. In some embodiments, the spacing may vary between the left side 232 and the right side 234.

The first fluid sensor 226-1 includes first leads 236-1. The first leads 236-1 may connect to one or more power sources, leak management systems, or other control elements. In the embodiment shown, the first leads 236-1 extend out of the top side 228. However, it should be understood that the first leads 236-1 may extend out of any edge of the first absorbent material 224-1. In some embodiments, the first leads 236-1 may extend out of an edge based on a location of the connectors in the particular tray, shelf, or other placement location.

In the embodiment shown, the first fluid sensor 226-1 has a wave or sinusoidal pattern. However, it should be understood that the first fluid sensor 226-1 may have any particular shape or pattern, including a stepped pattern, an irregular pattern, or any other pattern. The pattern of the first fluid sensor 226-1 may be based on the placement of the first absorbent pad 222-1, the pattern of the cooling system, any other basis, and combinations thereof.

In the embodiment shown in FIG. 2-2, a second absorbent pad 222-2 may include a second fluid sensor 226-2 connected to a second absorbent material 224-2. The second fluid sensor 226-2 may be connected to the second absorbent material 224-2 in a sinusoidal pattern. The second fluid sensor 226-2 may be oriented so that a long edge of the second fluid sensor 226-2 may extend between a left side 232 and a right side 234 of the second absorbent material 224-2. The second fluid sensor 226-2 may pass from the left side 232 to the right side 234, loop around at the right side 234, and pass back to left side 232. This pattern may be repeated from the top side 228 to the bottom side 230.

In some embodiments, the length of the wires between the left side 232 and the right side 234 may be based on a width of the second absorbent material 224-2 between the left side 232 and the right side 234. In some embodiments, the wires may extend across greater than 50%, greater than 60%, greater than 70%, greater 80%, greater than 90%, greater than 95%, greater than 99%, or across an entirety of the width of the second absorbent material 224-2 between the left side 232 and the right side 234. In some embodiments, the second fluid sensor 226-2 may extend across greater than 90% of the second absorbent material 224-2 to allow the second fluid sensor 226-2 to sense fluid absorbed by the second absorbent material 224-2 at the edge of the left side 232 and/or at the edge of the right side 234.

In some embodiments, the repeating lengths of the second fluid sensor 226-2 may extend between the top side 228 and the bottom side 230. In some embodiments, the repeating lengths of the second fluid sensor 226-2 may extend across greater than 50%, greater than 60%, greater than 70%, greater 80%, greater than 90%, greater than 95%, greater than 99%, or across an entirety of the length of the second absorbent material 224-2 between the top side 228 and the bottom side 230. In some embodiments, the second fluid sensor 226-2 may extend across greater than 90% of the second absorbent material 224-2 to allow the second fluid sensor 226-2 to sense fluid absorbed by the second absorbent material 224-2 at the edge of the top side 228 and/or at the edge of the bottom side 230.

The second fluid sensor 226-2 includes second leads 236-2. The second leads 236-2 may connect to one or more power sources, leak management systems, or other control elements. In the embodiment shown, the second leads 236-2 extend out of the left side 232. However, it should be understood that the second leads 236-2 may extend out of any edge of the second absorbent material 224-2. In some embodiments, the second leads 236-2 may extend out of an edge based on a location of the connectors in the particular tray, shelf, or other placement location.

Figures 1, 2:
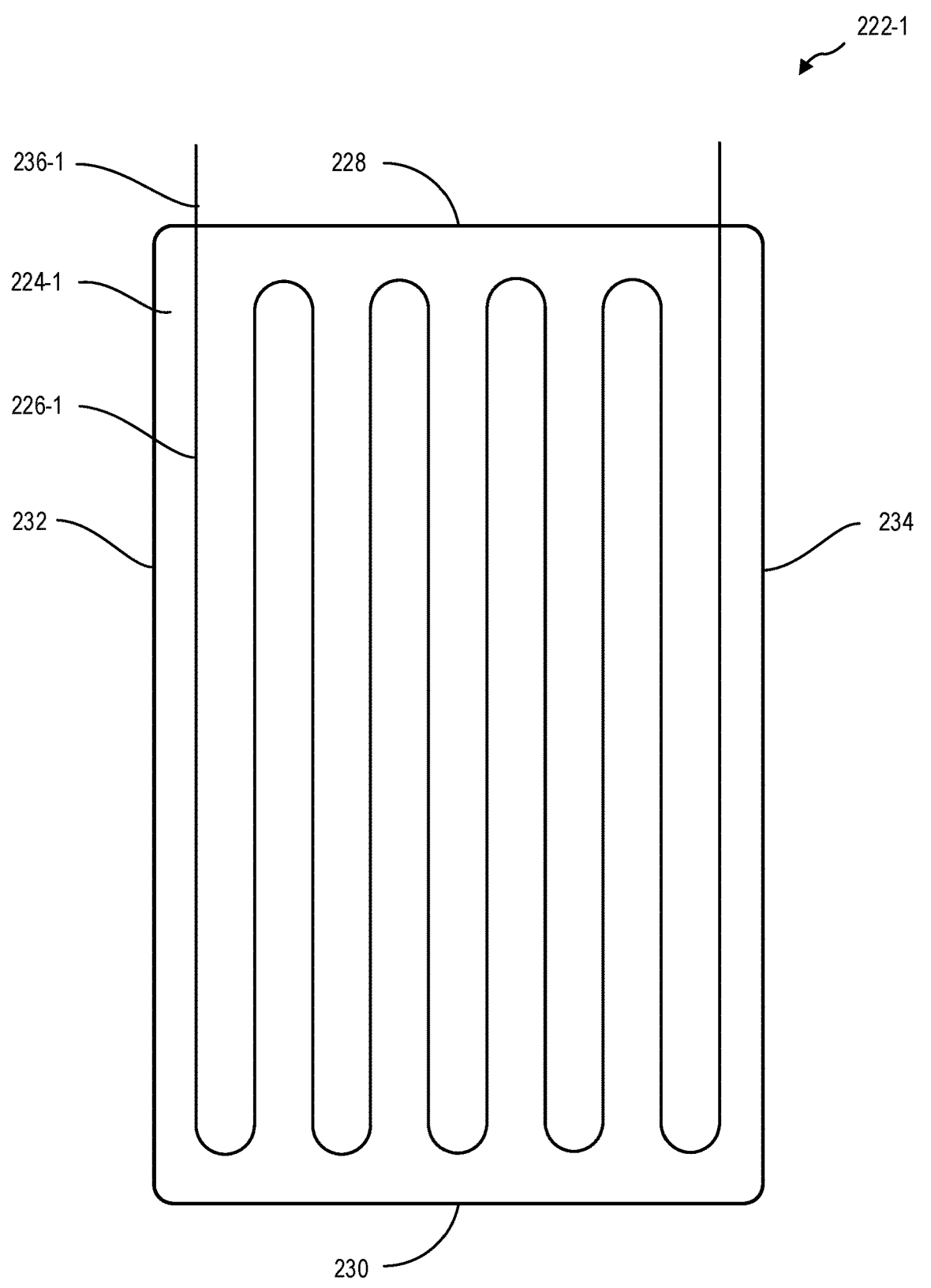
Figure 2:
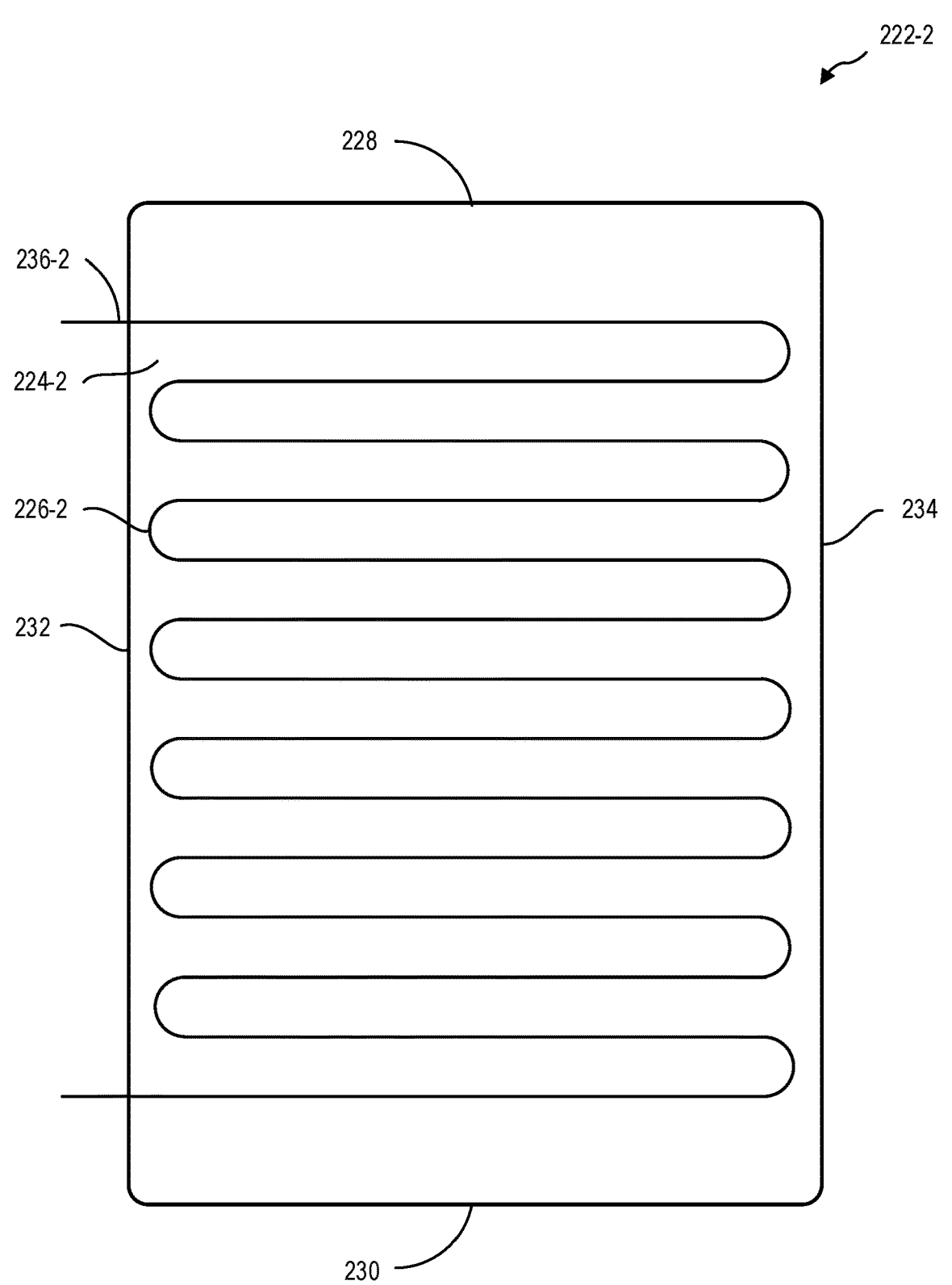
Figures 2, 3, 4:
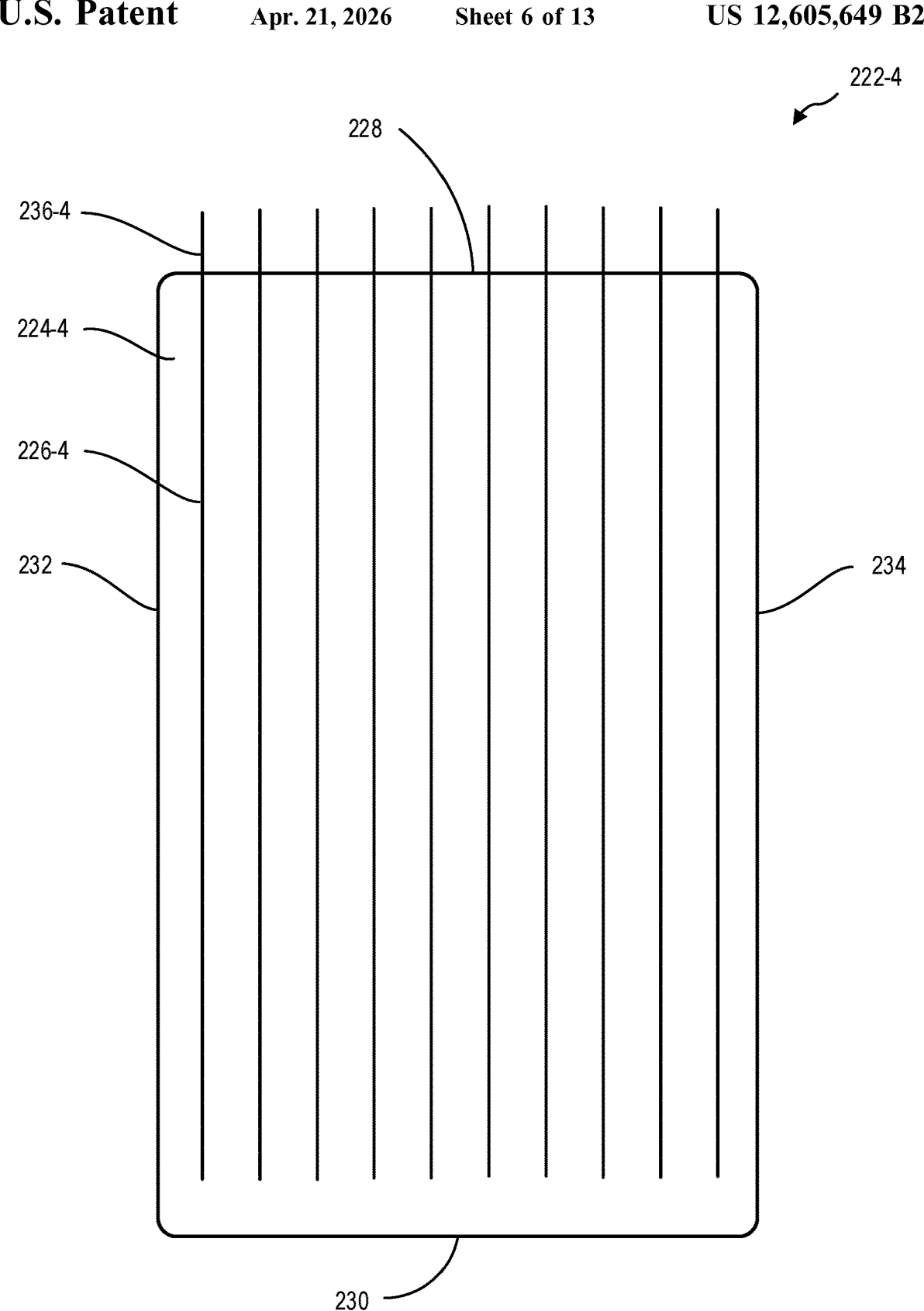
Figures 1, 3:
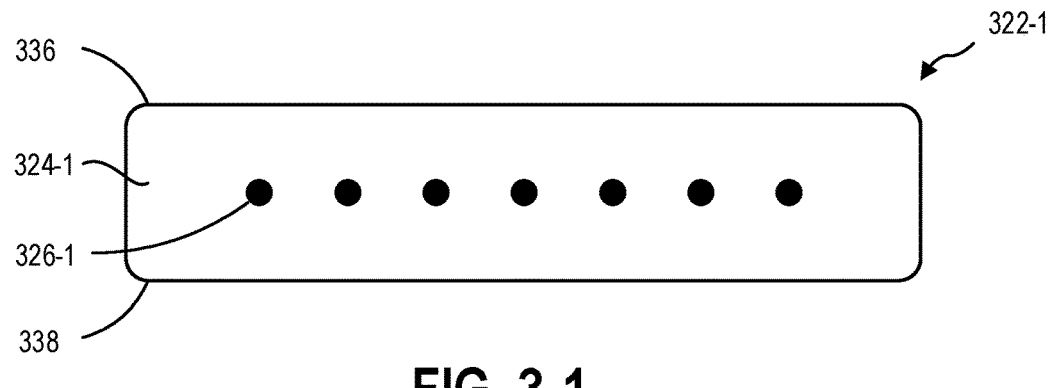
Figures 2, 3:
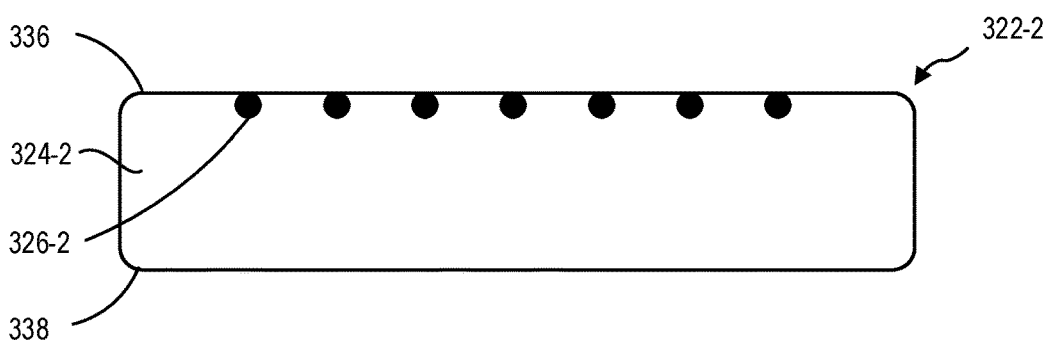
Figure 3:
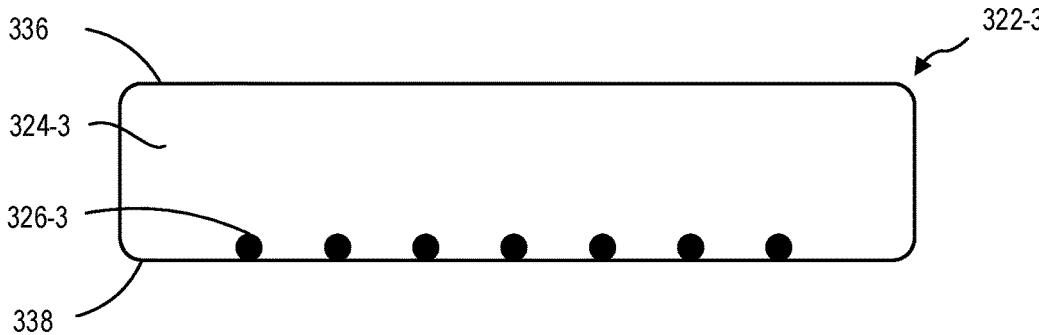
Figures 3, 4:
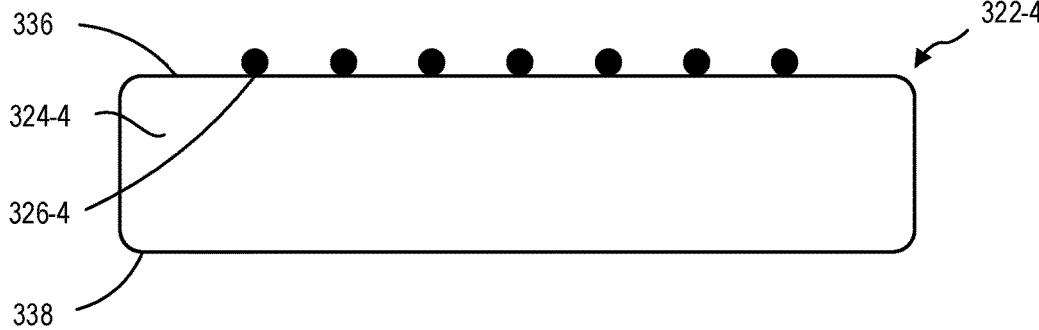
Figure 4:
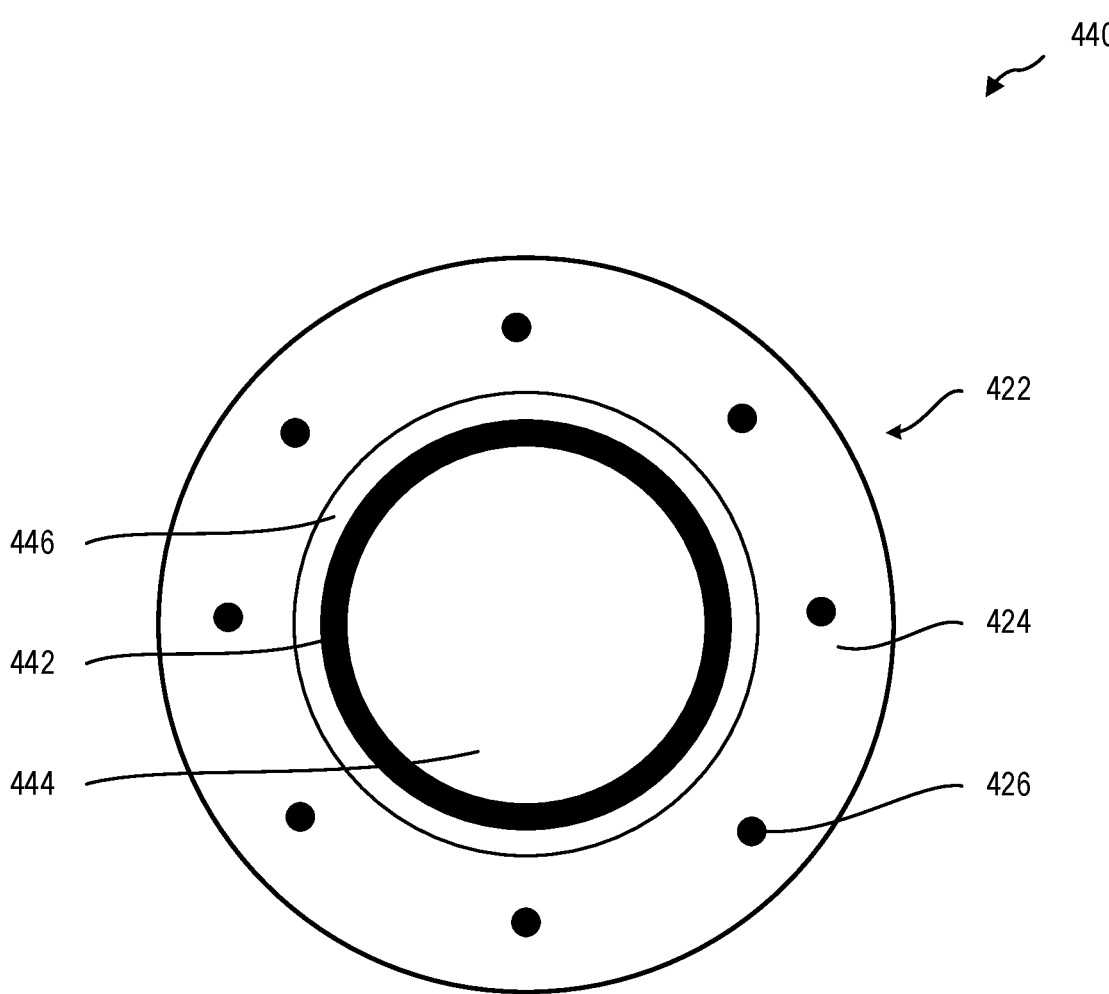

In the embodiment shown in FIG. 2-3, a third absorbent pad 222-3 may include a third fluid sensor 226-3 connected to a third absorbent material 224-3. The third fluid sensor 226-3 may include multiple wires that extend across a surface of the third absorbent material 224-3. In some embodiments, the third fluid sensor 226-3 may include two overlapping sinusoidal patterns. For example, the third fluid sensor 226-3 may include the patterns of wires illustrated by the first fluid sensor 226-1 and the second fluid sensor 226-2, shown in FIG. 2-1 and FIG. 2-2, respectively. Put another way, the third fluid sensor 226-3 may include a first sensor oriented on the third absorbent material 224-3 in a first direction and a second sensor oriented on the third absorbent material 224-3 in a second direction such that the first sensor and the second sensor at least partially overlap or portions of the first sensor and the second sensor overlap.

In accordance with at least one embodiment of the present disclosure, including overlapping wires on the third fluid sensor 226-3 may allow the third fluid sensor 226-3 to determine a location of a fluid absorbed by the third absorbent material 224-3. For example, the location of the absorbed fluid may be determined by comparing the changes in resistance across the overlapping wires of the third fluid sensor 226-3.

The third fluid sensor 226-3 may include third leads 236-3. In the embodiment shown, the third leads 236-3 extend out of the left side 232 and the top side 228. However, it should be understood that the third leads 236-3 may extend out of any edge of the third absorbent material 224-3, based on the anticipated connections to a leak management system. In some embodiments, each wire in the third fluid sensor 226-3 may have its own third leads 236-3. This may allow each wire in the third fluid sensor 226-3 to separately identify the presence of the absorbed fluid.

In the embodiment shown in FIG. 2-4, a fourth absorbent pad 222-4 may include a fourth fluid sensor 226-4 connected to a fourth absorbent material 224-4. The fourth fluid sensor 226-4 may include multiple wires that extend across a surface of the fourth absorbent material 224-4. In the embodiment shown, the fourth fluid sensor 226-4 may include multiple different wires that are oriented to extend across the fourth absorbent material 224-4 from the top side 228 to the bottom side 230. The separate wires of the fourth fluid sensor 226-4 may be located on the fourth absorbent material 224-4 between the left side 232 and the right side 234.

In accordance with at least one embodiment of the present disclosure, the multiple wires of the fourth fluid sensor 226-4 may each be able to independently identify the presence of a fluid absorbed by the fourth absorbent material 224-4. This may help to identify the location and/or amount of the fluid absorbed by the fourth absorbent material 224-4.

In the embodiment shown in FIG. 2-5, a fifth absorbent pad 222-5 may include a fifth fluid sensor 226-5 connected to a fifth absorbent material 224-5. The fifth fluid sensor 226-5 may include multiple wires that extend across a surface of the fifth absorbent material 224-5. In the embodiment shown, the fifth fluid sensor 226-5 may include multiple different wires that are oriented to extend across the fifth absorbent material 224-5 from the left side 232 to the right side 234. The separate wires of the fifth fluid sensor 226-5 may be located on the fifth absorbent material 224-5 between the top side 228 and the bottom side 230.

In accordance with at least one embodiment of the present disclosure, the multiple wires of the fifth fluid sensor 226-5 may each be able to independently identify the presence of a fluid absorbed by the fifth absorbent material 224-5. This may help to identify the location and/or amount of the fluid absorbed by the fifth absorbent material 224-5. Each wire of the fifth fluid sensor 226-5 may have its own fifth lead 236-5. Each fifth lead 236-5 may allow the fifth fluid sensor 226-5 to determine the location and/or amount of the absorbed fluid.

In the embodiment shown in FIG. 2-6, a sixth absorbent pad 222-6 may include a sixth fluid sensor 226-6 connected to a sixth absorbent material 224-6. The sixth fluid sensor 226-6 may include multiple wires that extend across a surface of the sixth absorbent material 224-6. In the embodiment shown, the sixth fluid sensor 226-6 may include multiple different wires that are oriented to extend across the sixth absorbent material 224-6 from the left side 232 to the right side 234. The separate wires of the sixth fluid sensor 226-6 may be located on the sixth absorbent material 224-6 between the top side 228 and the bottom side 230. The sixth fluid sensor 226-6 may further include multiple different wires that are oriented to extend across the sixth absorbent material 224-6 from the top side 228 to the bottom side 230. The separate wires of the sixth fluid sensor 226-6 may further be located on the sixth absorbent material 224-6 between the left side 232 and the right side 234. As may be seen, the sixth fluid sensor 226-6 includes a first set of wires oriented in a first direction and a second set of wires oriented in a second direction. Orienting the wires in different directions may help to improve the sensitivity of the sixth fluid sensor 226-6.

In accordance with at least one embodiment of the present disclosure, the multiple wires of the sixth fluid sensor 226-6 may each be able to independently identify the presence of a fluid absorbed by the sixth absorbent material 224-6. This may help to identify the location and/or amount of the fluid absorbed by the sixth absorbent material 224-6. Each wire of the sixth fluid sensor 226-6 may have its own sixth lead 236-6. Each sixth lead 236-6 may allow the sixth fluid sensor 226-6 to determine the location and/or amount of the absorbed fluid. In some embodiments, the overlapping wires of the sixth fluid sensor 226-6 may improve the precision of the location and/or amount measurements.

FIG. 3-1 through FIG. 3-4 are representations of absorbent pads (collectively 322) having a fluid sensor (collectively 326) connected to an absorbent material (collectively 324), according to at least one embodiment of the present disclosure. The absorbent pads 322 may be configured, placed, or located to collect fluid at or around a fluid-cooled computing device, such as the fluid-cooled computing devices discussed herein. In some embodiments, the absorbent pads 322 may be placed loose in a position to absorb fluid from the fluid-cooled computing device. In some embodiments, the absorbent pads 322 may be secured relative to the fluid-cooled computing device. For example, the absorbent pads 322 may be secured to a surface at or near the fluid-cooled computing device using any connection mechanism, such as a mechanical fastener, a pressure sensitive adhesive, a heat sensitive adhesive, a radio frequency adhesive, a latch, a strap, any other connection mechanism, and combinations thereof.

In some embodiments, the first absorbent material 324-1 may include an adhesive layer connected to one or more ends of the absorbent material 324. For example, an adhesive may be connected to a lower side 338 of the absorbent material 324. The adhesive may secure the absorbent material 324 to a surface. This may help the absorbent pads 322 to maintain position during movement of the fluid-cooled computing device, such as during installation and/or maintenance activities. In some embodiments, the adhesive layer may be connected to any side of the absorbent material 324, such as the upper side 336, the lower side 338, the left side, and/or the right side, in the view shown.

As may be seen, the fluid sensor 326 may be located in any position relative to the absorbent material 324. For example, in the embodiment shown in FIG. 3-1, a first absorbent pad 322-1 has a first fluid sensor 326-1 embedded in an interior of a first absorbent material 324-1. In some embodiments, embedding the first fluid sensor 326-1 in the first absorbent material 324-1 may include connecting the first fluid sensor 326-1 between the upper side 336 and the lower side 338. Put another way, the first fluid sensor 326-1 may be embedded in the first absorbent material 324-1 when the first fluid sensor 326-1 is located between the upper side 336 and the lower side 338. The first fluid sensor 326-1 may be located at any depth between an upper side 336 and a lower side 338 of the first absorbent material 324-1. For example, the first fluid sensor 326-1 may be located 10%, 20%, 30%, 40%, 50%, 60%, 70%, 80%, 90%, or any value therebetween, between the upper side 336 and the lower side 338.

In some embodiments, the depth of the first fluid sensor 326-1 may determine a time after the fluid is absorbed by the first absorbent material 324-1 before the first fluid sensor 326-1 detects the fluid. For example, the fluid absorbed by the first absorbent material 324-1 may take a period of time to soak through the fibers or material of the first absorbent material 324-1. A drop of fluid that contacts the upper side 336 may take time to soak through the material of the first absorbent material 324-1 to the lower side 338. Placing the first fluid sensor 326-1 closer to the upper side 336 may cause the first fluid sensor 326-1 to detect the fluid relatively soon. Placing the first fluid sensor 326-1 closer to the lower side 338 may cause the first fluid sensor 326-1 to detect the fluid relatively late. In this manner, a sensitivity of the first fluid sensor 326-1 to a time after detection of an absorbed fluid may be based, at least in part, on the position of the first fluid sensor 326-1 between the upper side 336 and the lower side 338.

In some embodiments, the depth of the first fluid sensor 326-1 may determine a minimum fluid volume that may cause the first fluid sensor 326-1 to detect the absorbed fluid. For example, a drop of fluid that comes into contact with the upper side 336 may soak through the first absorbent material 324-1. The drop of fluid may not contain enough fluid volume to soak through an entirety of the first absorbent material 324-1. In some situations, a drop of fluid absorbed at the upper side 336 may not soak or travel through the first absorbent material 324-1 to the lower side 338. A minimum fluid volume may contact the upper side 336 to soak through to the lower side 338, or any position between the upper side 336 and the lower side 338.

In some embodiments, the depth of the first fluid sensor 326-1 between the upper side 336 and the lower side 338 may determine a minimum detection volume of the fluid that may be absorbed by the first absorbent material 324-1 before the first fluid sensor 326-1 may detect the presence of the absorbed fluid. For example, placing the first fluid sensor 326-1 closer to the upper side 336 may result in a lower minimum detection volume. Placing the first fluid sensor 326-1 closer to the lower side 338 may result in a higher minimum detection volume. In this manner, the placement of the first fluid sensor 326-1 between the upper side 336 and the lower side 338 may help to calibrate a minimum detection volume. Understanding the minimum detection volume may help the leak mitigation system to determine whether the absorbed fluid represents a leak that should be controlled. For example, an absorbed fluid volume less than the minimum detection volume may indicate another source of fluid, such as condensation from cold cooling fluid cooling the inlet pipes and/or hoses.

In the embodiment shown in FIG. 3-2, a second absorbent pad 322-2 includes a second fluid sensor 326-2 embedded in a second absorbent material 324-2 at the upper side 336. In some embodiments, the second fluid sensor 326-2 may be located at or just below the surface of the second absorbent material 324-2 at the upper side 336. As discussed herein, a second fluid sensor 326-2 located at the upper side 336 may allow the second fluid sensor 326-2 to have a relatively low detection time and/or a relatively low detection volume. In this manner, the second fluid sensor 326-2 may be relatively sensitive to small fluid leaks.

In the embodiments shown in FIG. 3-3, a third absorbent pad 322-3 includes a third fluid sensor 326-3 embedded in a third absorbent material 324-3 at the lower side 338. In some embodiments, the third fluid sensor 326-3 may be located at or just above the surface of the second absorbent material 324-2 at the lower side 338. As discussed herein, a third fluid sensor 326-3 located at the lower side 338 may allow the third fluid sensor 326-3 to have a relative high detection time and/or a relatively high detection volume. In this manner, the third fluid sensor 326-3 may be relatively insensitive to small fluid leaks. This may help to prevent false alarms of leaks.

In the embodiment shown in FIG. 3-4, a fourth absorbent pad 322-4 includes a fourth fluid sensor 326-4 connected to a fourth absorbent material 324-4 at the upper side 336. In the embodiment shown, the fourth fluid sensor 326-4 is connected to the fourth absorbent material 324-4 on top of the upper side 336. this may allow the fourth fluid sensor 326-4 to detect any fluid that may come into contact with or be absorbed by the fourth absorbent material 324-4 at the upper side 336, thereby increasing the sensitivity of the fourth fluid sensor 326-4.

FIG. 4 is a representation of cross-sectional view of a leak mitigation system 440 having an absorbent pad 422 wrapped around a coolant pipe 442, according to at least one embodiment of the present disclosure. As discussed herein, the coolant pipe 442 may include a coolant fluid flowing through a bore 444 therethrough. In some embodiments, cold coolant fluid flowing through the bore 444 may cool the coolant pipe 442. Contact of the cold coolant pipe 442 with the atmosphere may cause moisture in the air to condense on the outside of the coolant pipe 442. In some embodiments, an absorbent material 424 of the absorbent pad 422 may absorb the condensed fluid, thereby preventing it from dripping or falling onto the fluid-cooled computing device.

In some embodiments, the absorbent pad 422 may include a fluid sensor 426 connected to or embedded in the absorbent material 424. The fluid sensor 426 may detect a fluid absorbed by the absorbent material 424. In some embodiments, the absorbent pad 422 may absorb fluid that flows out of the absorbent pad 422 from a leak in the coolant pipe 442. This may help to prevent the leaking fluid from dripping or onto a liquid-cooled computing device, thereby reducing or preventing damage to the liquid-cooled computing device. In some embodiments, the fluid sensor 426 may detect a leak and the leak mitigation system 440 may help to implement one or more leak mitigation protocols to prevent the leak from overwhelming the absorption capacity of the absorbent material 424.

In some embodiments, the absorbent pad 422 may be secured to the coolant pipe 442 in any manner. For example, the absorbent pad 422 may be secured to the coolant pipe 442 with an adhesive layer 446 connected to the absorbent material 424. The absorbent material 424 may be wrapped around an outer surface of the coolant pipe 442, and the adhesive layer 446 may stick to the coolant pipe 442. A technician or operator may wrap the pipes 442 in a coolant system with absorbent pads 422. This may help to mitigate leaks in the coolant system before the coolant may contact the fluid-cooled computing system.

In some embodiments, the absorbent pad 422 may include a coagulant or sealant material. For example, the absorbent pad 422 may include a material that, upon contact with an absorbed fluid, may cause the fluid to change phase from a liquid to a solid or a gel. In some embodiments, the coagulant may harden upon contact with the fluid. In some embodiments, the coagulant may harden upon contact with a cooling fluid, but not hard upon contact with water, thereby allowing the absorbent pad 422 to differentiate between cooling fluid and condensation on cooling pipes or hoses. The solidified fluid may help to seal or reduce the size of the leak in the coolant pipe 442. This may be a passive mitigation protocol. Put another way, a coagulant in the absorbent pad 422 may help mitigate a leak without transmitting a signal using the fluid sensor 426.

Figure 5:
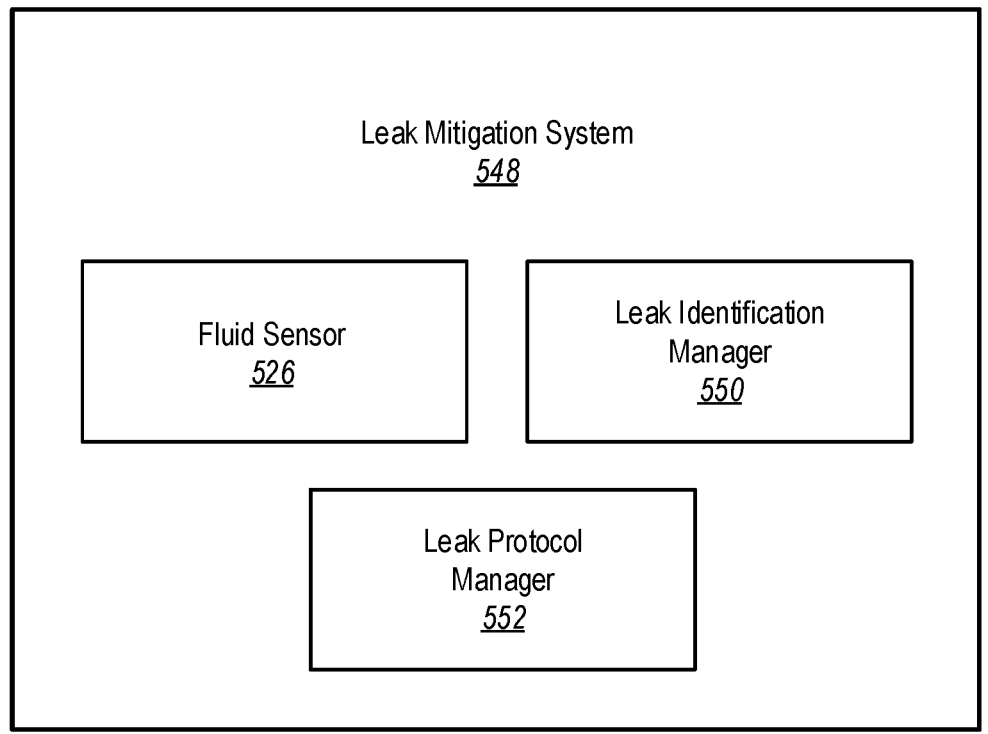

FIG. 5 is a representation of a leak mitigation system 548, according to at least one embodiment of the present disclosure. Each of the components of the leak mitigation system 548 can include software, hardware, or both. For example, the components can include one or more instructions stored on a computer-readable storage medium and executable by processors of one or more computing devices, such as a client device or server device. When executed by the one or more processors, the computer-executable instructions of the leak mitigation system 548 can cause the computing device(s) to perform the methods described herein. Alternatively, the components can include hardware, such as a special-purpose processing device to perform a certain function or group of functions. Alternatively, the components of the leak mitigation system 548 can include a combination of computer-executable instructions and hardware.

Furthermore, the components of the leak mitigation system 548 may, for example, be implemented as one or more operating systems, as one or more stand-alone applications, as one or more modules of an application, as one or more plug-ins, as one or more library functions or functions that may be called by other applications, and/or as a cloud-computing model. Thus, the components may be implemented as a stand-alone application, such as a desktop or mobile application. Furthermore, the components may be implemented as one or more web-based applications hosted on a remote server. The components may also be implemented in a suite of mobile device applications or "apps."

In accordance with at least one embodiment of the present disclosure, the leak mitigation system 548 may be in contact or communication with an absorbent pad, including the absorbent pads discussed herein. In some embodiments, the leak mitigation system 548 may be in communication with a fluid sensor 526 connected to an absorbent material of the absorbent pad.

In some embodiments, a leak identification manager 550 may be in communication with the fluid sensor 526. The leak identification manager 550 may receive measurements from the fluid sensor 526 to determine whether the absorbent material has absorbed a fluid. In some embodiments, the leak identification manager 550 may apply a current to the fluid sensor 526. The leak identification manager 550 may detect the resistance of the fluid sensor 526, which may indicate whether the absorbent material has absorbed a fluid.

In accordance with at least one embodiment of the present disclosure, and as discussed herein, the leak identification manager 550 may identify the presence of an absorbed fluid. In some embodiments, the leak identification manager 550 may identify an amount of fluid absorbed by the absorbent material. In some embodiments, the leak identification manager 550 may identify a location of fluid absorbed by the absorbent material. In some embodiments, the leak identification manager 550 may identify a rate of change in the amount and/or location of the absorbed fluid. In some embodiments, the leak identification manager 550 may distinguish between different fluids absorbed by the absorbent material. For example, the leak identification manager 550 may identify the absorbed fluid based on resistance characteristics measured by the fluid sensor 526.

In some embodiments, when the leak identification manager 550 determines that a leak is present in the cooling system, the leak identification manager 550 may communicate the leak to a leak protocol manager 552. The leak protocol manager 552 may implement a mitigation protocol in the cooling system. The mitigation protocols may include any mitigation protocol. For example, the mitigation protocol may include turning off one or more cooling system pumps. In some examples, the mitigation protocol may include shutting a valve in a cooling fluid hose or pipe. In some examples, the mitigation protocol may include shutting a valve that is closest to the identified leak. In some embodiments, the valve may reduce cooling fluid flow to a cold plate connected to a single server or processor. In some embodiments, the mitigation protocol may include providing an alarm or notification to a user or a technician.

Figure 6:
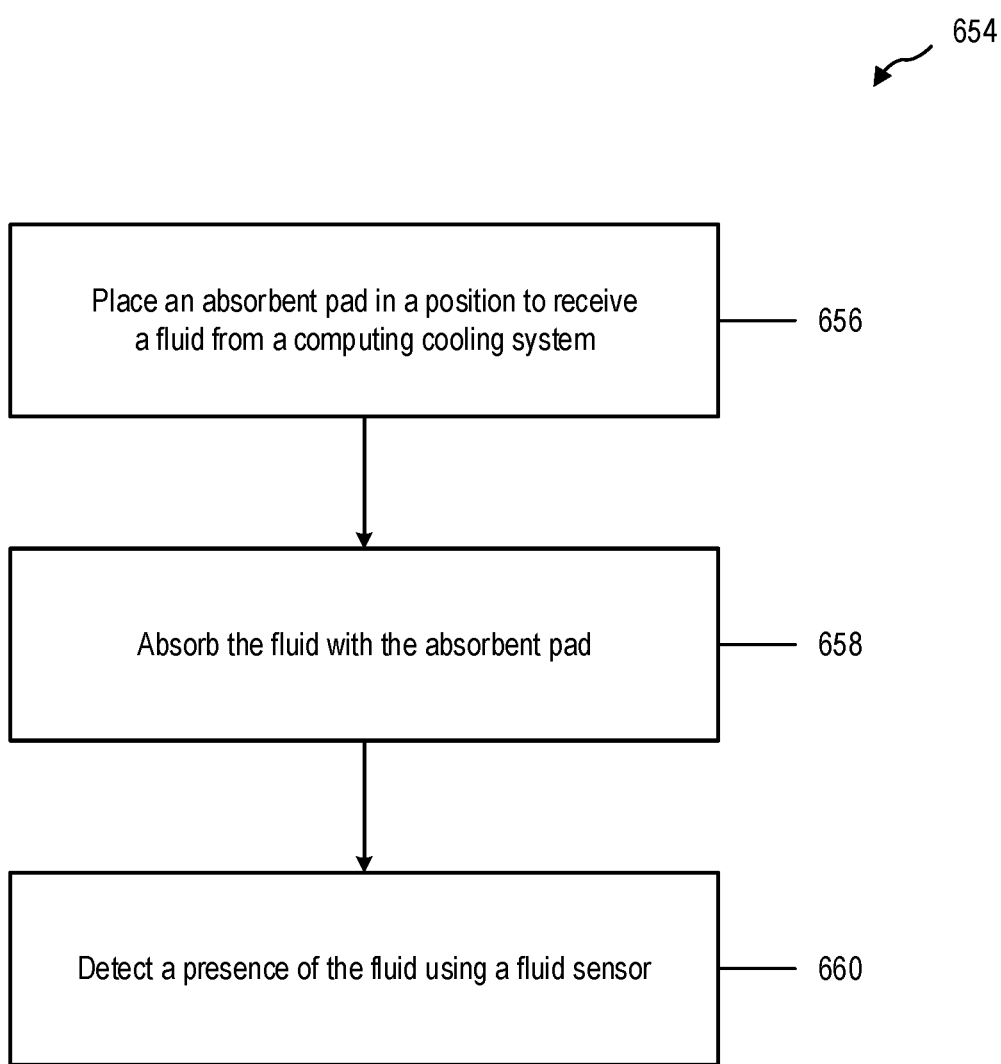

FIG. 6 is a flowchart of a method 654 for detecting a leak in a fluid-cooled computing device, according to at least one embodiment of the present disclosure. The method 654 may be implemented by a leak mitigation system. For example, the method 654 may be implemented by the leak mitigation system 548 of FIG. 5. Put another way, the leak mitigation system 548 of FIG. 5 may implement the method 654.

In some embodiments, the method 654 may include placing an absorbent pad in a position to receive a fluid from a computing cooling system at 656. As discussed herein, the absorbent pad may be placed in any location to receive the fluid, including underneath portions of the cooling system, underneath a cooling plate, underneath a server, wrapped around a cooling hose, any other location, and combinations thereof. In some embodiments, the absorbent pad may be placed to receive a fluid from the cooling system The absorbent pad may absorb the fluid at 658. As discussed herein, an absorbent material of the absorbent pad may absorb the fluid. In some embodiments, the absorbent material may absorb cooling fluid leaked from the cooling system. In some embodiments, the absorbent material may absorb water condensed on the surface of hoses or pipes of the cooling system.

In accordance with at least one embodiment of the present disclosure, the absorbent pad may detect a presence of the fluid using a fluid sensor at 660. As discussed herein, the fluid sensor may detect any fluid quality of the absorbed fluid, such as location, amount, rate of absorption, type of fluid, any other quality, and combinations thereof. In some embodiments, the method 654 may include implementing a mitigation protocol, such as stopping cooling fluid from flowing to the source of the leak or providing an alarm or a notification.

Figure 7:
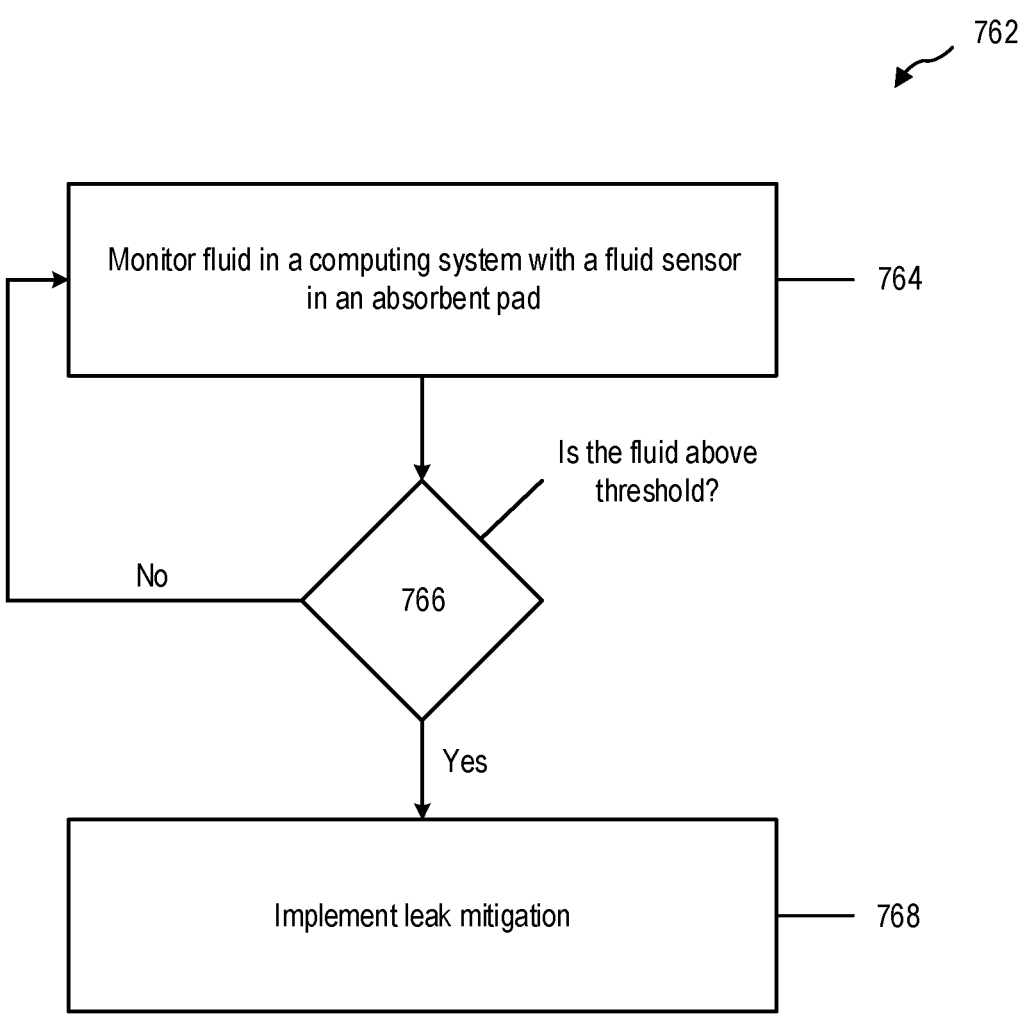
FIG. 7 is a representation of a method for leak mitigation, according to at least one embodiment of the present disclosure.

FIG. 7 is a flowchart of a method 762 for detecting and mitigating a leak in a fluid-cooled computing device, according to at least one embodiment of the present disclosure. The method 762 may be implemented by a leak mitigation system. For example, the method 762 may be implemented by the leak mitigation system 548 of FIG. 5. Put another way, the leak mitigation system 548 of FIG. 5 may implement the method 762.

The method 762 may include monitoring fluid in a fluid-cooled computing system with a fluid sensor located in an absorbent pad at 764. As discussed herein, monitoring the fluid may include monitoring for leaks in a cooling system. Fluid leaked from the cooling system may be absorbed by an absorbent material in the absorbent pad. The fluid sensor may detect the presence of the fluid. In some embodiments, the leak mitigation system may continuously monitor the fluid in the computing system. For example, the fluid sensor may collect measurements periodically.

The leak mitigation system may determine 766 whether the fluid is above a fluid threshold. The fluid threshold may be any type of threshold. For example, the fluid threshold may be a minimum fluid volume. If the detected fluid exceeds the minimum fluid volume, then the fluid is above the threshold, and the leak mitigation system may implement a leak mitigation protocol at 768. If the detected fluid does not exceed the minimum fluid volume, then the fluid is below the threshold, and the leak mitigation system may continue to monitor the fluid in the computing system. In some embodiments, the total volume may be the total volume over a period of time.

In some embodiments, the fluid threshold may include a fluid location. For example, the fluid location may be a particularly sensitive location, such as below a valve, below a server, below a cold plate, below a processor, or other sensitive location. If the sensed fluid is detected in the sensitive location, then the leak mitigation system may implement the mitigation protocol. If not, then the leak mitigation system may continue to monitor the absorbed fluid.

In some embodiments, the fluid threshold may be a rate of fluid absorption. For example, if the rate of fluid absorption is above a maximum rate, then the leak mitigation system may implement a leak mitigation protocol. If the rate of fluid absorption is below the maximum rate, then the leak mitigation system may continue to monitor the absorbed fluid.

In some embodiments, the fluid threshold may be a type of fluid. For example, if the leak mitigation system detects cooling fluid absorbed by the absorbent material, then the leak mitigation system may determine that a leak is present and implement a leak mitigation protocol. If the leak mitigation system detects absorbed water, then the leak mitigation system may determine that the fluid is condensation, and continue to monitor for leaked cooling fluid. Monitoring the absorbed fluid for a threshold, as discussed herein, may allow the leak mitigation system to actively monitor and reduce the severity of a leak.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. An absorbent pad for a fluid-cooled computing device, comprising:
an absorbent material configured to absorb a fluid from the fluid-cooled computing device; and
a fluid sensor connected to the absorbent material to detect a presence of the fluid absorbed by the absorbent material, wherein the fluid sensor includes a plurality of wires, wherein a spacing between wires is reduced in areas disposed below a critical area of the computing device.

2. The absorbent pad of claim 1, wherein the fluid absorbed by the absorbent material changes a resistance of the plurality of wires.

3. The absorbent pad of claim 1, wherein the fluid sensor is embedded in the absorbent material at a depth that determines a time after the fluid is absorbed by the absorbent material before the fluid sensor detects the fluid and determines a minimum detection volume of the fluid, wherein the absorbent pad further comprises a leak mitigation system including instructions based on the time and the minimum detection volume of the fluid.

4. The absorbent pad of claim 1, wherein the fluid sensor has a sensor coverage of greater than 90% of an area of the absorbent material.

5. The absorbent pad of claim 1, wherein the fluid sensor includes a first sensor oriented on the absorbent material in a first direction and a second sensor oriented on the absorbent material in a second direction.

6. The absorbent pad of claim 1, wherein the fluid sensor is configured to detect a type of fluid, the absorbent pad further comprising a leak mitigation system including instructions wherein if water is detected, the absorbent pad is allowed to dry and no actions to mitigate the leak are generated and wherein if the fluid is detected, actions to mitigate the leak are generated.

7. The absorbent pad of claim 1, further comprising a coagulant that hardens upon contact with a cooling fluid, but does not harden upon contact with water.

8. A computing system, comprising:
at least one heat generating element;
a cooling system including a fluid; and
an absorbent pad configured to absorb the fluid from the cooling system, the absorbent pad including:
an absorbent material; and
a fluid sensor connected to the absorbent material, wherein the fluid sensor includes a plurality of wires, wherein a spacing between wires is reduced in areas disposed below a critical area of the computing system.

9. The computing system of claim 8, wherein the absorbent pad is located below the at least one heat generating element.

10. The computing system of claim 8, wherein the cooling system includes one or more pipes, and wherein the absorbent pad is connected to the one or more pipes.

11. The computing system of claim 8, wherein the absorbent material includes a coagulant that hardens upon contact with the fluid but not upon contact with condensation.

12. The computing system of claim 8, wherein the cooling system includes a valve, the valve being connected to the fluid sensor and configured to reduce a fluid flow upon detection of the fluid by the fluid sensor.

13. The computing system of claim 8, wherein the fluid sensor is configured to detect a type of fluid, the computing system further comprising a leak mitigation system including instructions wherein if water is detected, the absorbent pad is allowed to dry and no actions to mitigate the leak are sent to the cooling system and wherein if the fluid is detected, actions to mitigate the leak are sent to the cooling system.

14. A method for detecting a leak in a fluid-cooled computing device, comprising:
placing an absorbent pad in a position to receive a fluid from a cooling system;
absorbing the fluid with the absorbent pad; and
detecting a presence of the fluid absorbed by the absorbent pad using a fluid sensor connected to the absorbent pad, wherein the fluid sensor includes a plurality of wires, wherein a spacing between wires is reduced in areas disposed below a critical area of the fluid-cooled computing device.

15. The method of claim 14, wherein detecting the presence of the fluid includes detecting a location of the fluid on the absorbent pad.

16. The method of claim 15, wherein detecting the location of the fluid includes detecting the location based on a first fluid sensor oriented in a first direction and a second fluid sensor oriented in a second direction.

17. The method of claim 14, wherein absorbing the fluid includes absorbing a total amount of fluid in the cooling system.

18. The method of claim 14, further comprising shutting off fluid flow to at least a portion of the cooling system based on detecting the presence of the fluid.

19. The method of claim 18, wherein shutting off fluid flow to the portion of the cooling system includes closing a valve.

20. The method of claim 18, wherein the fluid sensor is configured to detect a type of fluid, wherein if water is detected, shutting off fluid flow to at least a portion of the cooling system does not occur, the method further comprising drying the absorbent pad if water is detected.

* * * * *